United States Patent
Marzahn et al.

(10) Patent No.: US 9,806,511 B2
(45) Date of Patent: Oct. 31, 2017

(54) METHOD OF MANUFACTURING A SUPERCONDUCTIVE CABLE

(71) Applicant: NEXANS, Paris (FR)

(72) Inventors: Erik Marzahn, Langenhagen (DE); Mark Stemmle, Hannover (DE)

(73) Assignee: NEXANS, Paris (FR)

(*) Notice: Subject to any disclaimer, the term of this patent is extended or adjusted under 35 U.S.C. 154(b) by 406 days.

(21) Appl. No.: 14/307,783

(22) Filed: Jun. 18, 2014

(65) Prior Publication Data
US 2014/0371077 A1 Dec. 18, 2014

(30) Foreign Application Priority Data

Jun. 18, 2013 (EP) .................................. 13305818

(51) Int. Cl.
*H02G 15/34* (2006.01)
*H01B 12/06* (2006.01)
*H02G 1/08* (2006.01)

(52) U.S. Cl.
CPC ............ *H02G 15/34* (2013.01); *H01B 12/06* (2013.01); *H02G 1/08* (2013.01); *Y02E 40/642* (2013.01); *Y02E 40/648* (2013.01); *Y10T 29/49014* (2015.01)

(58) Field of Classification Search
CPC ........ H01B 12/02; H01B 12/06; H01B 12/16; H02G 15/34; Y02E 40/648
USPC ............................................................ 29/599
See application file for complete search history.

(56) References Cited

U.S. PATENT DOCUMENTS

| | | | | |
|---|---|---|---|---|
| 4,902,995 A * | 2/1990 | Vermilyea | .......... | G01R 33/3815 174/15.4 |
| 7,709,742 B2 | 5/2010 | Allais et al. | | |
| 2004/0266628 A1* | 12/2004 | Lee | ........ | H01L 39/143 505/238 |
| 2010/0285968 A1 | 11/2010 | Gregory | | |
| 2012/0040841 A1* | 2/2012 | Soika | .......... | H01B 12/06 505/231 |

* cited by examiner

*Primary Examiner* — Paul Wartalowicz
(74) *Attorney, Agent, or Firm* — Sofer & Haroun, LLP

(57) ABSTRACT

A method is provided for manufacturing a superconductive cable equipped with means for compensating length changes caused by temperature changes which occur when the cable is cooled from room temperature to work temperature and vice-versa. A superconductive cable (SK) with a tubular, central carrier (1) is used which is surrounded by at least one superconductive conductor. Arranged in the carrier (1) is at least one tension-proof strand (2) arranged over the entire length of the carrier (1). Cable (SK) is initially wound, including strand (2), at room temperature onto a coil (SP). Subsequently, the strand (2) is immovably fastened to the two ends of the cable (SK) and the cable (SK) is subsequently wound off the coil (SP).

6 Claims, 1 Drawing Sheet

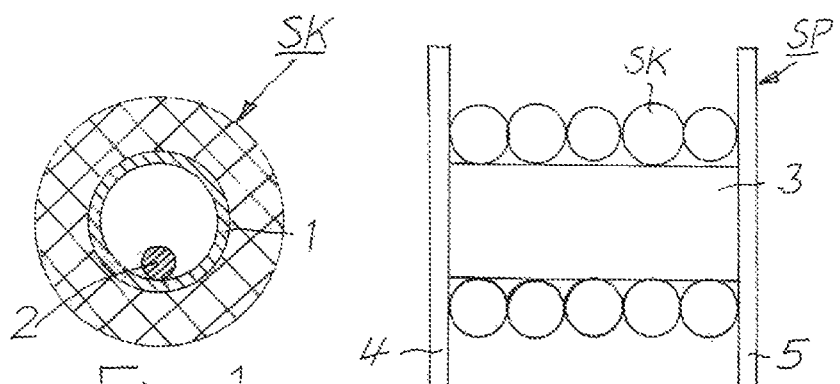
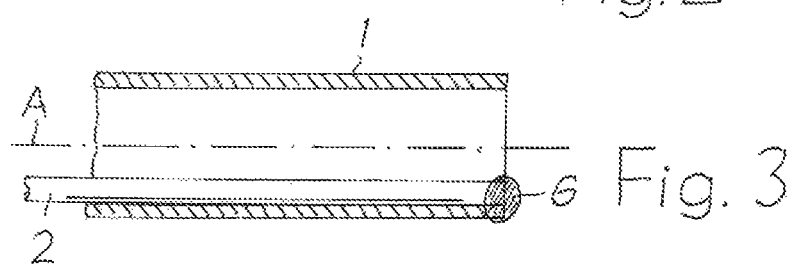
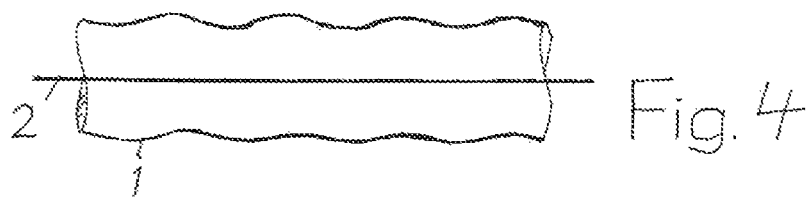
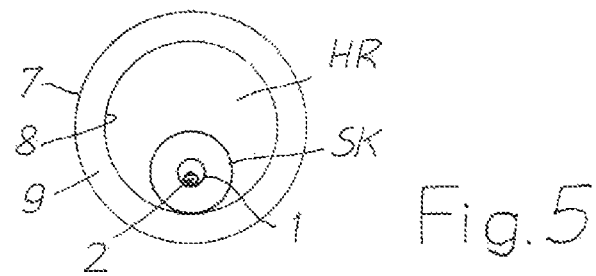
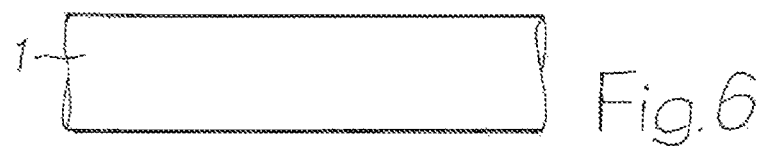

METHOD OF MANUFACTURING A SUPERCONDUCTIVE CABLE

RELATED APPLICATION

This application claims the benefit of priority from European Patent Application No 13 305 818.0, filed on Jun. 18, 2013, the entirety of which is incorporated by reference.

BACKGROUND

Field of the Invention

The invention relates to a method of manufacturing a superconductive cable which is equipped with means for compensating for the length changes which are created when the cable is cooled from room temperature to work temperature and vice-versa, and wherein a superconductive cable is used with a tubular central carrier which is surrounded by at least one superconductive conductor, and wherein in the carrier is arranged over the entire length thereof at least one tension-proof strand.

Description of Related Art

Such a superconductive cable is disclosed in for example, U.S. 2010/0285968 A1.

A superconductive cable has electrical conductors of a material which changes over into the superconductive state at sufficiently low temperatures. The electrical direct current resistance of a correspondingly conductor is zero if sufficient cooling has been carried out, as long as a certain current, i.e. the critical current, is not exceeded. Suitable superconductive materials are, for example, oxidic materials on the basis of rare earths (ReBCO), particularly YBCO (yttrium-barium-copper oxide), or BSCCO (bismuth-strontium-calcium-copper oxide). Sufficiently low temperatures for bringing such a material into the superconductive state are for example, 67 K and 110 K. However, there are also superconductive materials, for example, magnesium boride which must be cooled to even lower temperatures if they are to change into the superconductive state. Suitable cooling agents for all these materials are for example, nitrogen, helium, neon, and hydrogen, or mixtures of these substances.

When operating an arrangement with at least one superconductive cable, the latter is arranged in accordance with conventional technology, in a cryostat which consists of at least one thermally insulated pipe and through which a cooling agent is conducted which is suitable for the superconductive material being used, i.e. a cooling agent mentioned above. For achieving the superconductive state within the cryostat the cable is significantly cooled so that it becomes shorter as a result of the thermal contraction. In order to ensure the operability of the length of transmission, requirements have to be met through which the shortening of the cable is compensated. in such a way that it does not have a harmful influence on the cryostat or the cable on the one hand, as well as on the cryostat or the units connected to the cryostat or the cable, on the other hand.

In accordance with the method of EP 1 720 176 B1, a superconductive cable is shaped at room temperature through a cross-like network of wires having tensile strength, for example, of invar steel and are connected to the cable in a dot-like manner in such a way that it extends in accordance with the shape of a wave. The superconductive cable is introduced in the respective wave-like shape into a cryostat composed of two concentrically arranged pipes between which a vacuum insulation is provided, through which a cooling agent is conducted during the operation of the appropriate arrangement. The cable which becomes shorter as it cools changes over into a stretched state without generating a mechanical load on the cryostat or the units connected thereto. This method can be carried out in practice, however, it is very complicated.

The above mentioned U.S. 2010/0285968 A1 describes a method by means of which the thermal contractions of a superconductive cable are to be compensated. The cable has a tubular carrier around which two superconductive conductors separated from each other by an insulating layer are arranged. A strand with tensile strength is arranged in the carrier which is secured after the placement of the cable at both ends thereof, for example, by means of clamps. The ends of the cable are compressed in the axial direction by means of the strand in such a way that the conductors, at their ends, have a wave-shaped configuration resulting from the respective shortening of the length.

OBJECTS AND SUMMARY

It is the object of the invention to provide a superconductive cable which can be constructed in a simple manner and in an uncomplicated manner in such a way that length changes due to temperature changes can be compensated.

In accordance with the invention, this object is met in
that the cable is initially wound, including strand, onto a coil at room temperature,
that the strand is subsequently secured immovably to the cable at both ends thereof, and
that the cable is subsequently wound off the coil.

This method is simple and can be carried out without incurring any major assembly work. It is merely necessary to have a superconductive cable which has, independently of its number of superconductive conductors, a tubular pipe-shaped central carrier. Initially, at least one tension-proof strand is introduced which has to have only such a length without precise accuracy to size, only to such an extent that it is present at both ends of the cable. For example, the strand may consist of steel or of a tension-proof synthetic material. The cable equipped with the tension-proof strand is then wound onto a coil consisting of a core and two flanges forming the lateral limitations of the coil on both. sides. The strand now makes contact with the inner surface of the carrier facing the core of the coil. Subsequently, the strand is tightly and immovably fastened at both ends of the superconductive cable.

Subsequently, the superconductive cable is again wound off the coil. It then has an approximately linear shape. In so doing, the tension-proof strand is aligned along a straight line by the winding procedure. In this connection the strand has a length which is shorter between the two fixed points at the ends of the cable, which is determined by the distance of the strand from the axis or the neutral phase of the cable, so that when the cable is wound off the coil the strand holds the ends of the cable so that toe cable is deformed because of its length which is greater than that of the strand. This greater length can be converted, for example, in such a way that the cable is approximately wave shaped between its ends.

The superconductive cable deformed into a wave shape can be subsequently or, also directly during winding off of the coil, introduced into a cryostat. However, the tension-proof strand can also be arranged in a cryostat already prior to securing the tension-proof strand, and also in this embodiment the surrounded cable is wound onto a coil in a cryostat immovably secured onto a coil after winding the cryostat onto the two ends of the cable.

A superconductive cable becomes shorter when cooled from room temperature to operating temperature, for example, in the range of 0.3% and 0.5%. This means that for example, in the case of a length of toe cable of 600 m, a shortening of the cable from 600 m to 598 m or 597 m. The local conditions can be taken into consideration for example, through the diameter of the carrier or the inside width of the carrier with a variable distance of the tension-proof strand from the axis of the cable. However, it is also possible to arrange the tension-proof strand with a defined loose length in the carrier, so that when winding the cable from the coil, the coil changes over into a straight shape.

In order to preclude a possibly occurring impediment of the movement of the superconductive cable by the tension-proof strand when the cable is cooled, the strand is advantageously pulled from the carrier after unwinding the cable from the coil. Both steps are advantageously carried out only after the cable has been secured at its ends to units of a transmission length.

BRIEF DESCRIPTION OF THE DRAWINGS

The method according to the invention will be explained with the aid of the drawings as an embodiment of the invention.

In the drawing:

FIG. 1 is a schematic illustration of a cross section through a superconductive cable having a tubular central carrier.

FIG. 2 shows a coil with a superconductive cable wound onto the coil.

FIG. 3 shows an end of the carrier of the cable according to FIG. 1.

FIG. 4 shows schematically the pattern of the carrier after winding the cable from the coil.

FIG. 5 is a cross sectional view of a cryostat with a superconductive cable located in the cryostat.

FIG. 6 shows, also schematically, the pattern of the carrier after cooling of the cable.

DETAILED DESCRIPTION

FIG. 1 schematically illustrates a cross section of a superconductive cable SK which includes a tubular central carrier 1. The elements of the cable SK surround the carrier 1, wherein the innermost layer of the cable rests against the carrier 1. The composition of the cable SK is variable within wide limits. As a cable with hot dielectric, it only has to have a superconductive conductor and, as a cable with cold dielectric, the cable must have a superconductive conductor and an insulation (dielectric) surrounding the superconductive layer. Consequently, the composition of the cable is not discussed in detail.

The carrier 1 consists of metal such as for example, steel or copper. A tension-proof strand 2 is arranged in the carrier 1, wherein the strand 2 consists, for example, of steel or a tension-proof synthetic material. It is also possible to provide two or more tension-proof strands in the carrier 1. In the following description only the version with a tension-proof strand 2 is taken into consideration. The strand 2 must have at least the same length as the cable SK so that the strand 2 is present at both ends of the cable. The strand 2 is advantageously longer than the cable SK so that it protrudes from the cable SK at both ends.

For carrying out the method according to the invention, for example, the cable SK with the strand 2 located in the carrier 1 is wound at room temperature in at least one layer onto a coil SP which consists of a core 3 and two lateral flanges 4 and 5 which delimit the core SP. The drawing only shows the location of the wound cable SK in the form of circles without indicating the more precise details. Depending on the length of the cable SK, the cable can also be wound on the coil SP in two or more layers, one located above the other. When the coil SK is wound onto the cable SP, the strand 2 presses against the inner surface of the carrier 1 which faces the core 3 of the coil SP. As a result, the strand. has a distance to the axis A of the carrier 1 which depends on the diameter or the inside width of the carrier 1.

Once the at SK is wound over its entire length onto the coil SP, the tension-proof strand 2 is rigidly and immovably connected at both ends of the cable SK, preferably with its carrier 1. This is indicated in FIG. 3 for one cable end in which only the carrier 1 and the strand 2 are indicated. The connecting point 6 between both parts is also only illustrated schematically in FIG. 3. Depending on the degree of "waviness" of the cable SK which the cable SK is supposed to have after being wound from the coil SP, the strand 2 can be pulled off at its two ends in a tight manner, but also with a defined loose end in the carrier 1.

When the strand 2 is connected at both ends to the cable SK or its carrier 1, the cable SK can be wound off the coil SP. Because the strand 2 is connected at a distance from the axis A of the cable SK, or from the neutral phase thereof, in the carrier 1 the distance is shorter between the two fixed points at the ends of the cable SF than the distance between the same. This is indicated in FIG. 4 by two wave shaped lines which are supposed to represent the carrier 1. The strand 2 is drawn in FIG. 4 as a straight line.

The cable SK can then be introduced in the form shown in FIG. 4 in a cryostat KR schematically illustrated in FIG. 5. In the embodiment of FIG. 5, the cryostat KR consists of two concentrically arranged pipes 7 and 8 of metal, particularly of high grade steel, between which a vacuum in 9 is provided. The cryostat KR can also only consist of a thermally insulated pipe. It can be shaped around the wavy cable SK. However, it is also possible to pull or slide the wavy cable SK out of or into a prefabricated cryostat.

The cryostat KR also surrounds, in addition to the cable SK, a hollow space HR through which a cooling agent is conducted during the operation of the present arrangement. In so doing, the cable SK becomes shorter so that it changes over into a straight shape as it is once again only illustrated for the carrier 1 in FIG. 6.

In order to ensure with certainty that the movement of the cable SK during cooling is not impaired by the strand 2, which is then also cooled, it is advantageous to previously separate the strand 2 at least at one end of the cable SK from the same or from its carrier 1. Advantageously, the strand 2 is removed from the cable SK prior to cooling of the cable SK. Consequently, it is advantageous to separate the strand 2, at least at one end of the cable SK, to ensure with certainty that the movement of the cable SK is not impaired. It is advantageous to remove the strand 2 from the cable SK prior to the cooling of the cable SK. Both versions of the treatment of the strand 2 are advantageously only carried out when the cable SK is connected at its two ends to units of the transmission length.

In accordance with another embodiment the method according to the invention also can be carried out in such a way that the cable SK is initially introduced into a cryostat KR with the strand 2 being placed in the carrier 1. The cryostat KR, equipped in this manner, is then wound onto a coil in analogy to FIG. 2. Fastening of the strand 2 to the cable SK or to the carrier 1 thereof, as well as the further treatment of the cable SK which in this embodiment is already placed in the cryostat KR, are carried out in analogy to the preceding description.

The invention claimed is:

1. Method of manufacturing a superconductive cable equipped with means for compensating the length changes which are created when the cable is cooled from room temperature to work temperature and vice-versa, and where the superconductive cable having a tubular central carrier which is surrounded by at least one superconductive conductor, and where at least one tension proof strand is in the carrier, arranged over the entire length thereof, said method comprising the steps of:

the cable, together with the strand, is initially wound onto a coil at room temperature;

the strand is subsequently immovably secured to both ends of the cable while said cable and strand are still wound on said coil said strand thereby making contact with the inner surface of the carrier; and the cable is then wound off the coil.

2. Method according to claim 1, wherein the tension-proof strand is separated at least at one end of the cable from the cable.

3. Method according to claim 2, wherein the cable is pulled at its ends to units of a transmission length only when the tension-proof strand is separated from the cable or is pulled out of the carrier.

4. Method according to claim 1, wherein the cable wound from the coil is introduced into a tubular cryostat, which has at least one thermally insulated pipe, which surrounds a hollow space for conducting a cooling agent therethrough.

5. Method according to claim 1, wherein the cable is initially introduced into a cryostat which has at least one thermally insulated pipe;

the cryostat equipped in this manner is subsequently wound onto a coil;

the strand is subsequently immovably secured to both ends of the cable; and the cryostat is subsequently wound off the coil.

6. Method according to claim 1, wherein the tension-proof strand is pulled from the carrier after winding the cable or a cryostat off the coil.

* * * * *